United States Patent
Li et al.

(10) Patent No.: US 7,535,734 B2
(45) Date of Patent: May 19, 2009

(54) HIGH POWER-FACTOR AC/DC CONVERTER WITH PARALLEL POWER PROCESSING

(76) Inventors: Heng-Yi Li, 5F., No. 7, Lane 25, Jhongjheng Rd., Banciao City, Taipei County 220 (TW); Chin-Ching Tzeng, 23F. -3, No. 8, Lane 22, Baosheng Rd., Yonghe City, Taipei County 234 (TW)

( * ) Notice: Subject to any disclaimer, the term of this patent is extended or adjusted under 35 U.S.C. 154(b) by 277 days.

(21) Appl. No.: 11/583,138

(22) Filed: Oct. 19, 2006

(65) Prior Publication Data
US 2008/0094862 A1 Apr. 24, 2008

(51) Int. Cl.
*H02M 3/335* (2006.01)
(52) U.S. Cl. ............ 363/21.01; 323/207; 323/222; 323/266; 363/21.04; 363/21.12; 363/65; 363/89
(58) Field of Classification Search .......... 323/207, 323/222, 228, 266, 267, 224; 363/21.04, 363/21.12, 65, 89, 21.01
See application file for complete search history.

(56) References Cited

U.S. PATENT DOCUMENTS

| | | | | |
|---|---|---|---|---|
| 5,600,546 A | * | 2/1997 | Ho et al. | 363/21.18 |
| 5,856,917 A | * | 1/1999 | Aonuma et al. | 363/21.04 |
| 6,005,781 A | * | 12/1999 | Balakirshnan | 363/21.18 |
| 6,031,748 A | * | 2/2000 | Hong | 363/89 |
| 6,172,885 B1 | * | 1/2001 | Feldtkeller | 363/21.1 |
| 6,344,986 B1 | * | 2/2002 | Jain et al. | 363/89 |
| 6,600,667 B2 | * | 7/2003 | Francescutti et al. | 363/21.04 |
| 6,714,425 B2 | * | 3/2004 | Yamada et al. | 363/21.12 |
| 6,967,851 B2 | * | 11/2005 | Yang et al. | 363/16 |
| 6,980,446 B2 | * | 12/2005 | Simada et al. | 363/49 |
| 7,012,818 B2 | * | 3/2006 | Kotsuji et al. | 363/21.01 |
| 7,218,081 B2 | * | 5/2007 | Jang et al. | 323/266 |

* cited by examiner

*Primary Examiner*—Jeffrey L Sterrett

(57) ABSTRACT

The present invention is an AC/DC (alternating current to direct current) converter. The converter contains two semi-stages. One is the boost-flyback semi-stage that has excellent self-PFC property when operating in DCM even though the boost output is close to the peak value of the line voltage. Moreover, it allows part input power transferred to load directly through the flyback path so the power conversion efficiency is improved. The other one is the D/DC semi-stage that provides another parallel power flow path and improves the regulation speed.

9 Claims, 11 Drawing Sheets

HIGH POWER-FACTOR AC/DC CONVERTER WITH PARALLEL POWER PROCESSING

FIELD OF THE INVENTION

The present invention relates to AC/DC (alternating current to direct current) converter; more particularly, relates to single-stage single-switch parallel power processing high power factor AC/DC converter.

DESCRIPTION OF THE RELATED ARTS

To meet international requirements of input current harmonics, such as an IEEE or IEC regulations, power factor correction (PFC) is the key solution. Therefore, AC/DC (alternating current to direct current) converters have to perform PFC and output regulations simultaneously. Thus, two-stage converters are presented and the functional block is as shown in FIG. 1, where the bulk capacitor A11 is in the power transfer path between a PFC stage A12 and a DC/DC stage A13. Alternatively, the single-stage AC/DC converters are also presented as shown in FIG. 2, where two power stages are integrated to a single power stage A21 and a boost inductor A22 so that component count and cost could be reduced. However, part of the power is repeatedly processed and single full power path in both the two-stage and the single-stage AC/DC converters. Hence, efficiency is lost and components rating must fulfill full input power.

To improve the power processing, a parallel power factor correction (PPFC) has been proposed in "A novel single-phase power factor correction scheme" by Y. Jiang, F. C. Lee, G. Hua and W. Tang, 1993; and in "Single-stage single-phase parallel power factor correction scheme" by Y. Jiang and F. C. Lee, 1994. In the PPFC, 68% of average input power flows to output through one conversion stage, while remaining 32% has to be processed twice. However, the approach needs many control switches and complex control circuits.

Another approach to improve power processing is proposed in "A new family of single-stage AC/DC power factor correction converters with fast output voltage regulation" by O. Garcia, J. A. Cobos, P. Alou, R. Prieto, J. Uceda and S. Ollero, 1997; and in "Improving dynamic response of power-factor pre-regulators by using two-input high-efficient post-regulators" by J. Sebastian, P. J. Villegas, F. Nuno, O. Garcia and J. Arau, 1997. The parallel structure processes 50% of the average input power once, yet it has the problems of more switches, large capacitor size, limitation of input voltage, and the floating MOSFET (metal-oxide semiconductor field-effect transistor) driver of auxiliary module.

Although the above prior arts enhance power processing, some problems still exist, like more control switches, complex control circuits, limited input voltage and floating MOSFET. Hence, the prior arts do not fulfill users' requests on actual use.

SUMMARY OF THE INVENTION

The main purpose of the present invention is to improve power factor and to control DC output power simultaneously with a single loop output feedback control. Moreover, repeated power processing and single full power path are prevented.

To achieve the above purpose, the present invention is a parallel power processing AC/DC converter, comprising a full-wave rectifier, a boost-flyback semi-stage, a bulk capacitor, a DC/DC semi-stage module, a load and a control switch, where the DC/DC semi-stage is a forward circuit, a flyback circuit or two-in put post regulator. The full-wave rectifier is connected with a single phase AC voltage source and transfers input power to the boost-flyback semi-stage obtained by serially connecting a boost sub-circuit and a flyback sub-circuit. The boost-flyback semi-stage has an input, a flyback output and a boost output, while the input of the boost-flyback semi-stage receives the input power from the full-wave rectifier. The flyback output is an output of the flyback sub-circuit, which is connected to the load directly. Moreover, the boost output is an output of the boost sub-circuit, which is connected to the load through the bulk capacitor and the DC/DC semi-stage. The boost-flyback semi-stage and the DC/DC semi-stage both share with one control switch. Accordingly, a novel high power-factor AC/DC converter is obtained.

BRIEF DESCRIPTIONS OF THE DRAWINGS

The present invention will be better understood from the following detailed descriptions of the preferred embodiments according to the present invention, taken in conjunction with the accompanying drawings, in which FIG. 1 is the functional block of the conventional two-stage AC/DC converter; and FIG. 2 is the functional block of the conventional single-stage AC/DC converter;

DESCRIPTIONS OF THE PREFERRED EMBODIMENTS

The following descriptions of the preferred embodiments are provided to understand the features and the structures of the present invention.

Figure 1:
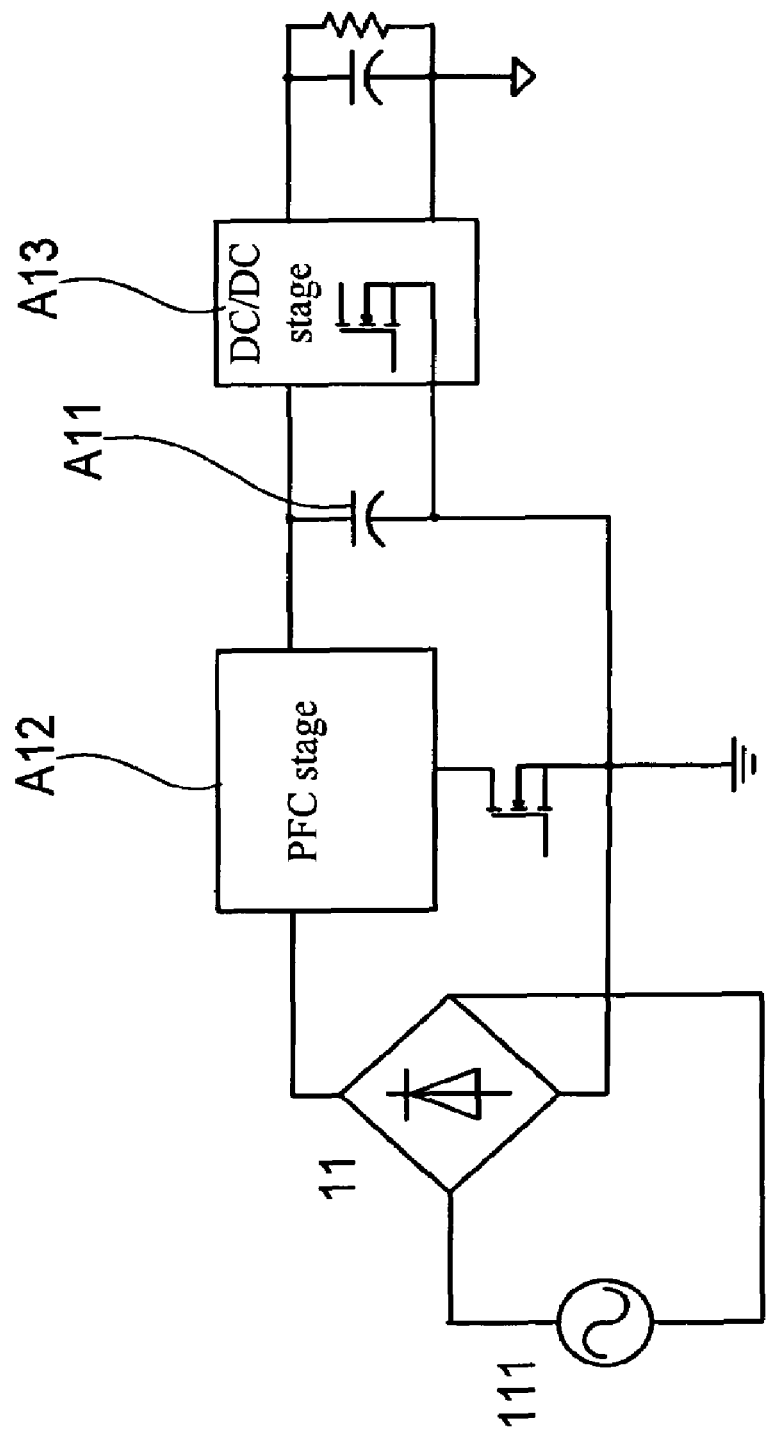
Figure 2:
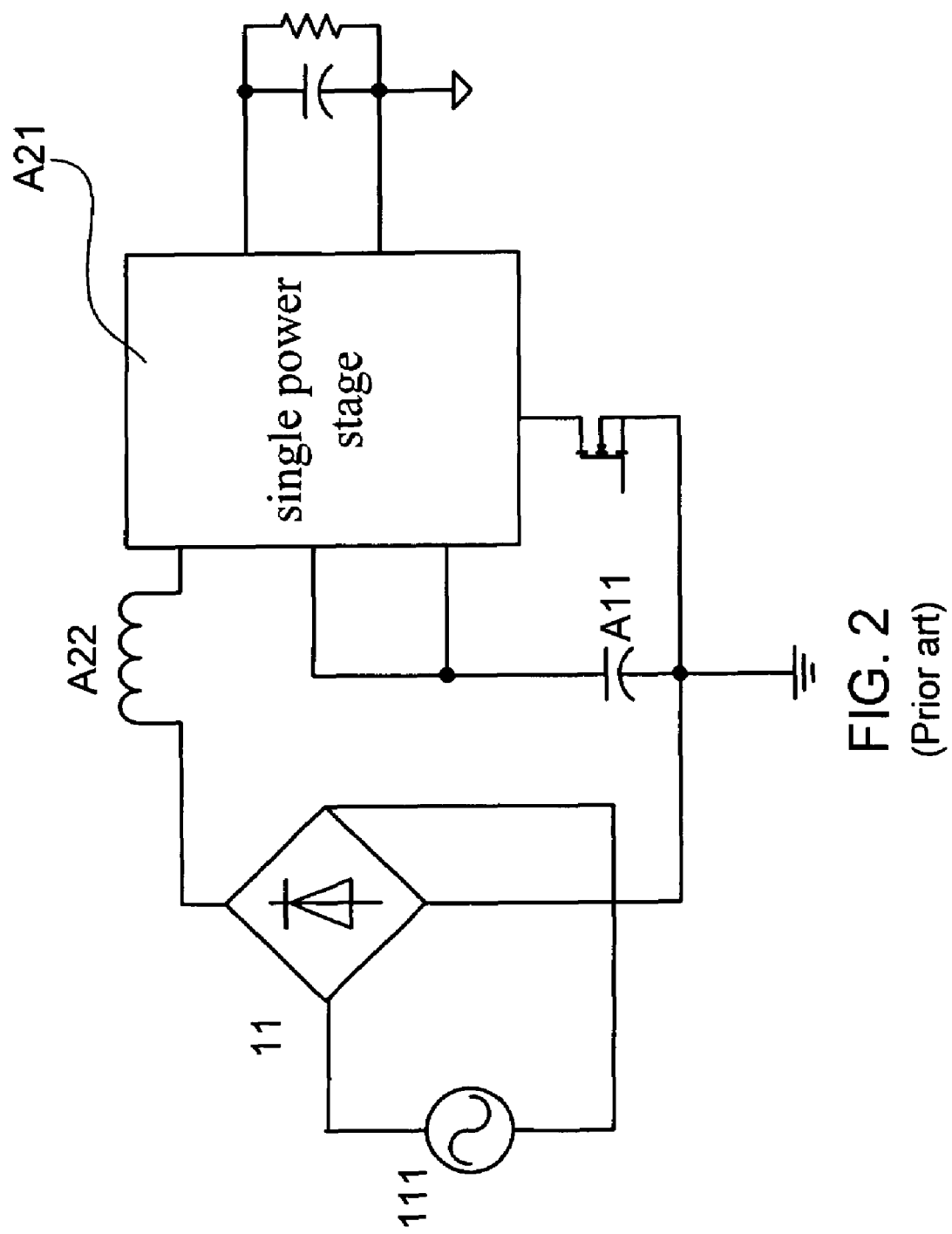
Figure 3A:
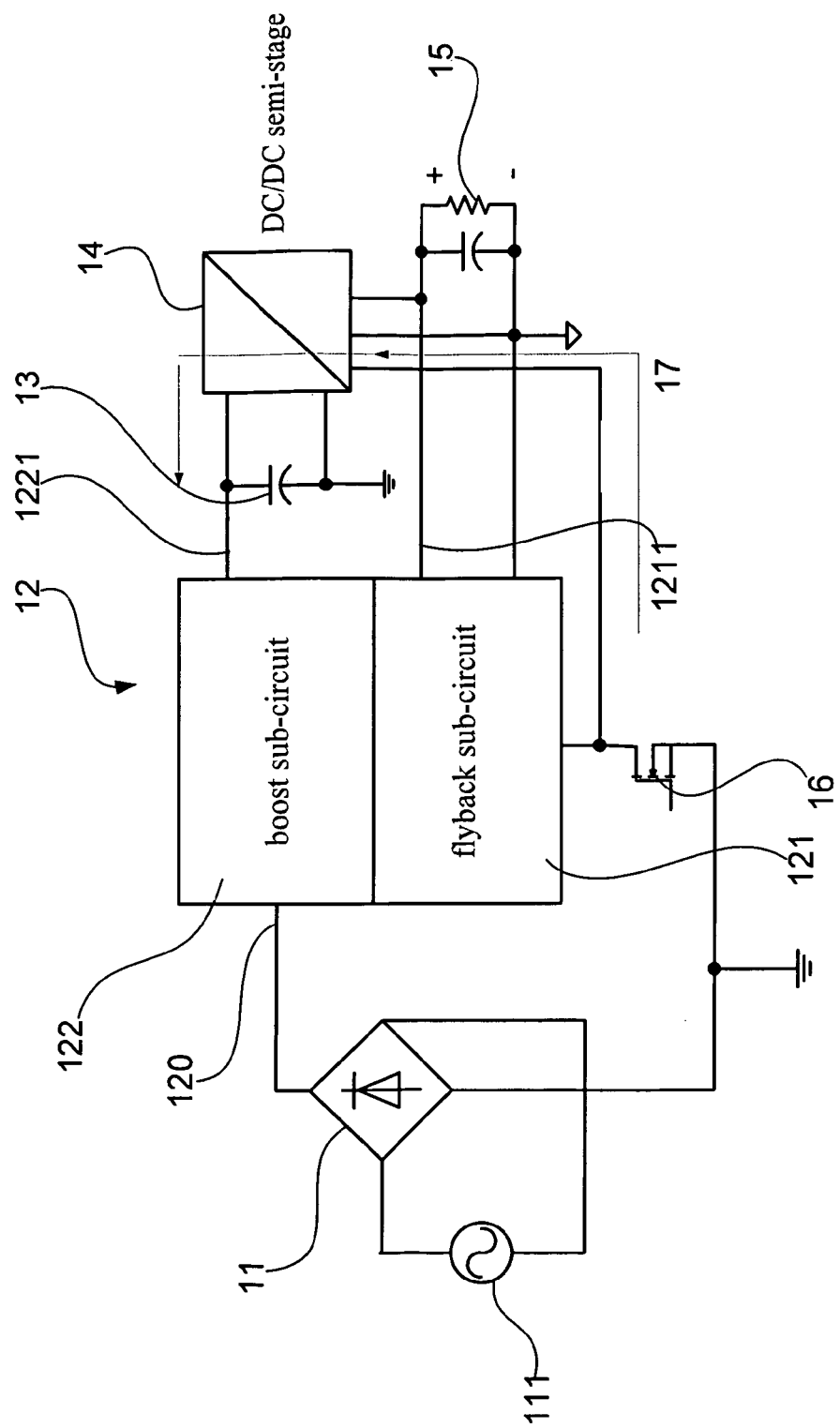
FIG. 3A is the functional block of the present invention.

Please refer to FIG. 3A, which is a functional block showing the present invention. In the circuit, the single switch two-output boost-flyback converter and DC/DC (direct current to direct current) converter are integrated to a single stage in parallel configuration. As shown in the figure, the present invention is a high power-factor AC/DC converter, comprising a full-wave rectifier 11, a boost-flyback semi-stage 12, a bulk capacitor 13, a DC/DC semi-stage 14, a load 15 and a control switch 16, where the full-wave rectifier 11 is connected with a single phase AC voltage source 111 at an input; the boost-flyback semi-stage 12 composed of flyback sub-circuit (or flyback sub-converter) 121 and boost sub-circuit (or boost sub-converter) 122 has an input 120, a flyback output 1211 and a boost output 1221; the bulk capacitor 13 is connected with the boost output 1221 of the boost-flyback semi-stage module 12; the input of the DC/DC semi-stage 14 is connected with the bulk capacitor 13; the first load 15 is connected with the flyback output 1211 of the boost-flyback semi-stage 12 and the output of the DC/DC semi-stage 14; and the control switch 16 is connected with the boost-flyback semi-stage 12 and the DC/DC semi-stage 14. The leakage inductance energy of flyback sub-circuit 121 can be recycled by bulk capacitor 13 through path 17. Thus, a novel high power-factor AC/DC converter is obtained.

Figure 3B:
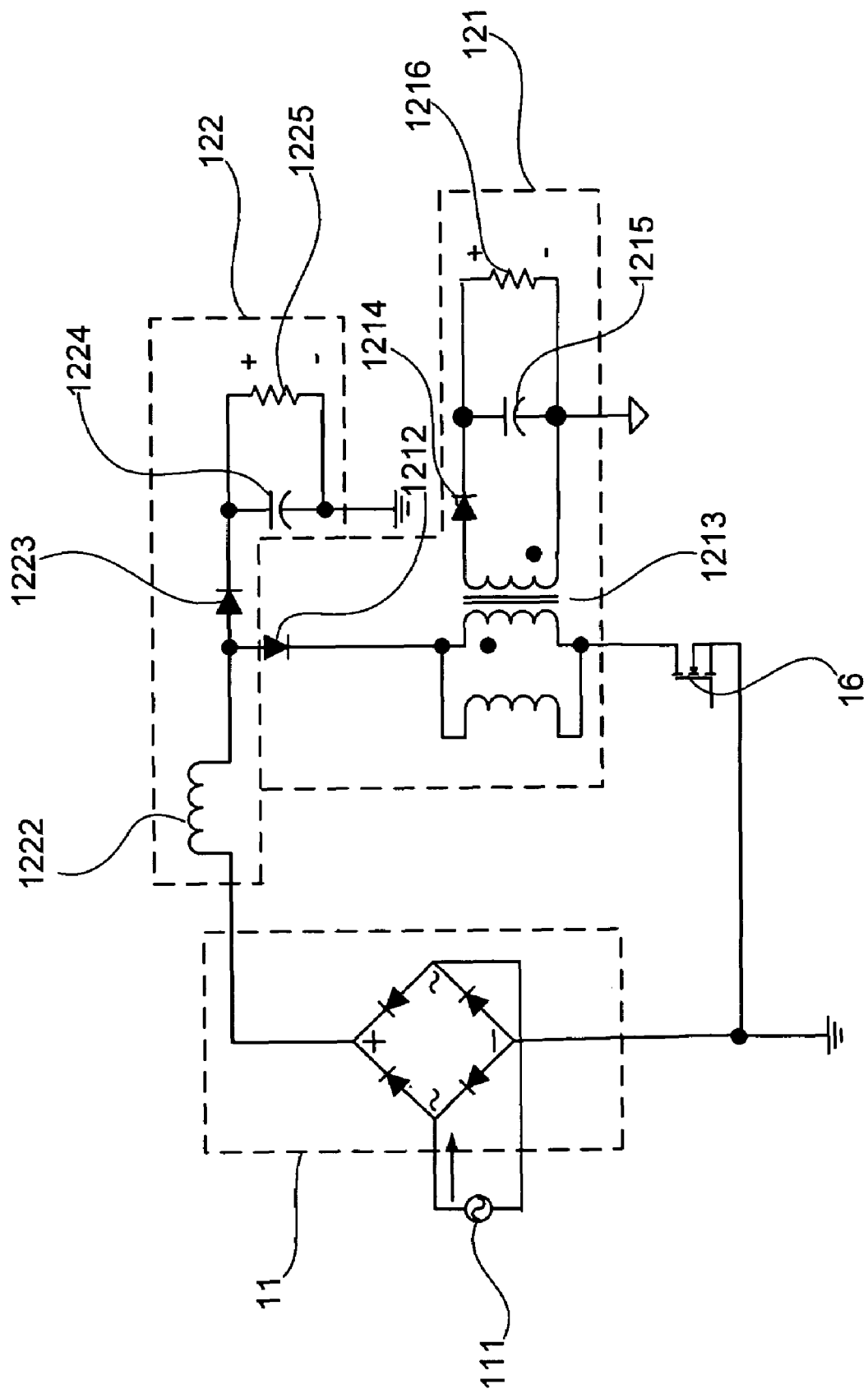
FIG. 3B is the circuit view showing the single-switch two-output boost-flyback converter.

Please refer to FIG. 3B, which is a circuit view showing a single switch two-output boost-flyback converter. As shown in the figure, when an AC voltage source 111 is fed into a full-wave rectifier 11, the AC voltage is rectified into a full-wave voltage; and input power is transferred to a boost-flyback converter 12 comprising a flyback sub-converter 121 and a boost sub-converter 122, where the flyback sub-converter 121 comprises a first diode 1212, a first transformer 1213, a second diode 1214, a first capacitor 1215 and a second load 1216; and the boost sub-converter 122 comprises a first inductance 1222, a third diode 1223, a second capacitor 1224 and a third load 1225. The first transformer 1213 of the flyback sub-converter 121 and the first inductance 1222 of the boost sub-converter 122 are both operated under a discontinuous current mode (DCM). The charging paths of the flyback sub-converter 121 and the boost sub-converter 122 are serially connected together; and the discharging paths of flyback sub-converter and the boost sub-converter are connected to the second load and the third load respectively. The flyback sub-converter 121 and the boost sub-converter 122 are connected to and controlled by the control switch 16, where the control switch 16 is a power transistor, a metal-oxide semiconductor field-effect transistor (MOSFET) or an insulated gate bipolar transistor (IGBT).

Figure 4A:
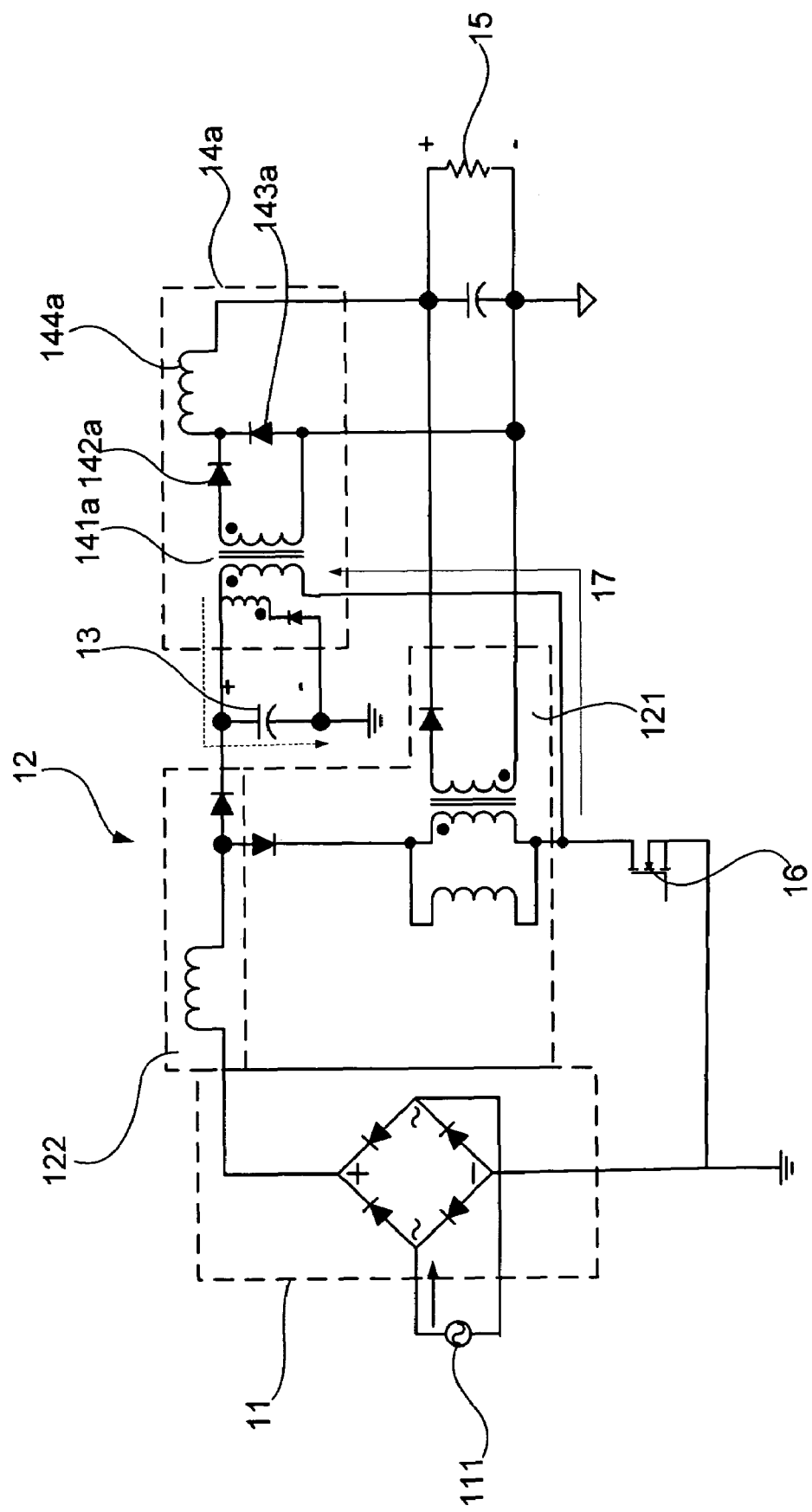
FIG. 4A is the circuit view showing the first preferred embodiment.

Please refer to FIG. 4A, which is a circuit view showing a first preferred embodiment. As shown in the figure, the DC/DC semi-stage 14 according to FIG. 3A is replaced with a forward semi-stage 14a; and a boost-flyback semi-stage 12 and the forward semi-stage 14a are connected with a control switch 16. The boost-flyback semi-stage 12 comprises a flyback sub-circuit 121 and a boost sub-circuit 122; a boost output 1221 is the output of the boost sub-circuit 122 and is connected with a first load 15 through a bulk capacitor 13 and the forward semi-stage 14a; a flyback output 1211 is an output of the flyback sub-circuit 121 and is directly connected with the first load 15; the forward semi-stage 14a comprises a second transformer 141a, a fourth diode 142a, a fifth diode 143a and a second inductance 144a; and the boost-flyback semi-stage 12 and the forward semi-stage 14a share the same control switch 16 to save components and to provide a recycling path 17 for a leakage inductance from the first transformer 1213 of the flyback sub-converter 121. When the control switch 16 is open, the leakage inductance energy of the first transformer 1213 is primarily recycled to the bulk capacitor 13 through primary coil of the second transformer 141a of the forward converter 14a.

The input 120 of the boost-flyback semi-stage 12 receives input power from the full-wave rectifier 11 and the in put power is divided into two portions Therein, the first portion of input power is processed by the flyback sub-circuit 121 and is directly transferred from the flyback output 1211 to the first load 15; and the second portion of input power is processed by the boost sub-circuit 122 to be transferred to the first load 15 through the bulk capacitor 13 and the forward semi-stage 14a.

The first preferred embodiment uses the boost-flyback semi-stage 12 to effectively improve power conversion efficiency and power factor; and the output power is adjusted through a forward semi-stage 14a. Because only part of in put power passes through the bulk capacitor 13, the voltage of the bulk capacitor 13 is not increased. Hence, the present invention is suitable for universal inputs.

Figure 4B:
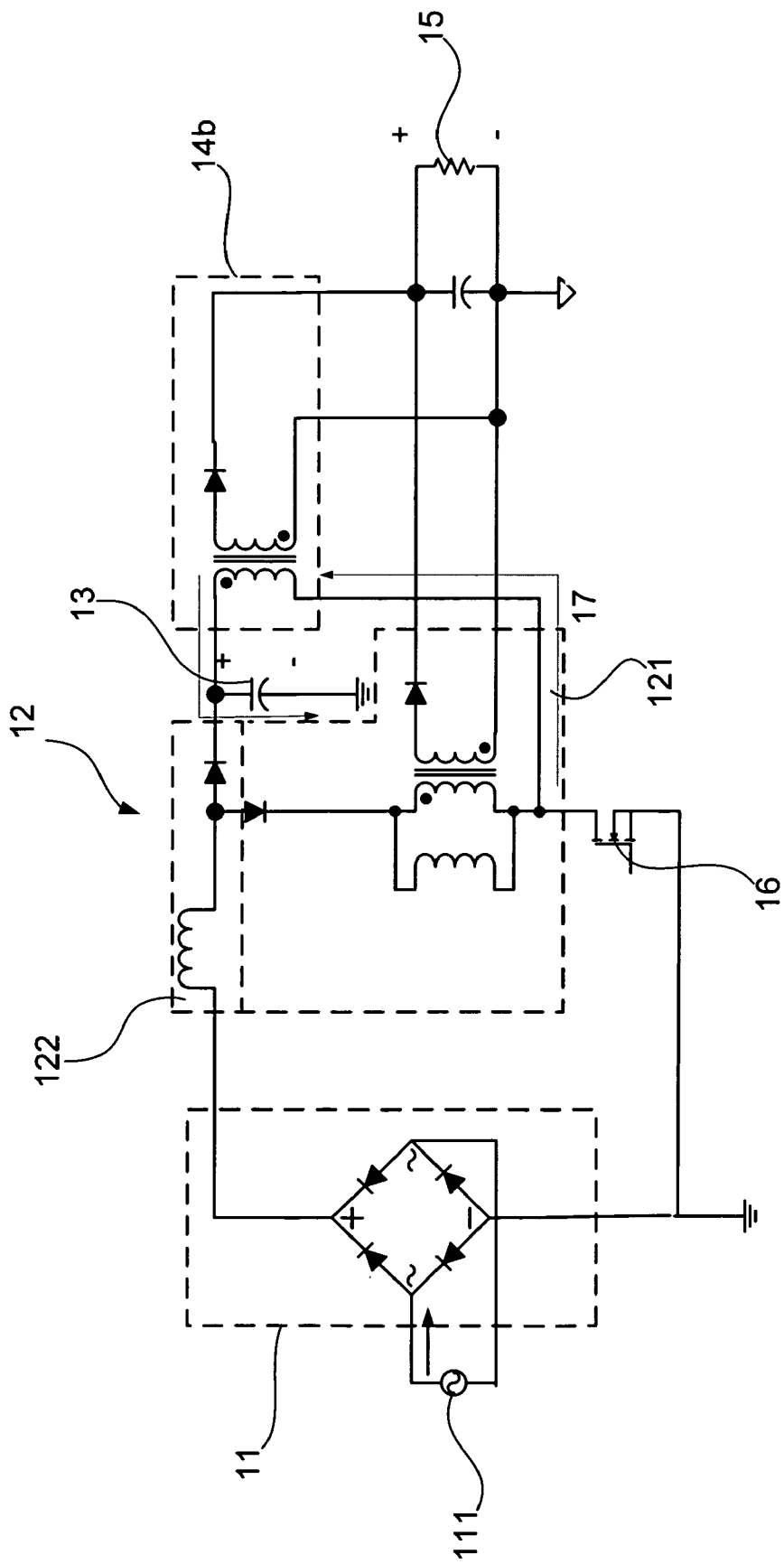
FIG. 4B is the circuit view showing the second preferred embodiment.

Please refer to FIG. 4B, which is a circuit view showing a second preferred embodiment. As shown in the figure, the second preferred embodiment comprises a full-wave rectifier 11 connected with a single phase AC voltage source 111; a boost-flyback semi-stage 12 comprising a flyback sub-circuit 121 and a boost sub-circuit 122; a bulk capacitor 13; the DC/DC semi-stage 14 according to FIG. 3A is replaced with a flyback semi-stage 14b; and a first load 15 where the boost-flyback semi-stage 12 and the flyback semi-stage 14b are both connected to the control switch 16.

Figure 4C:
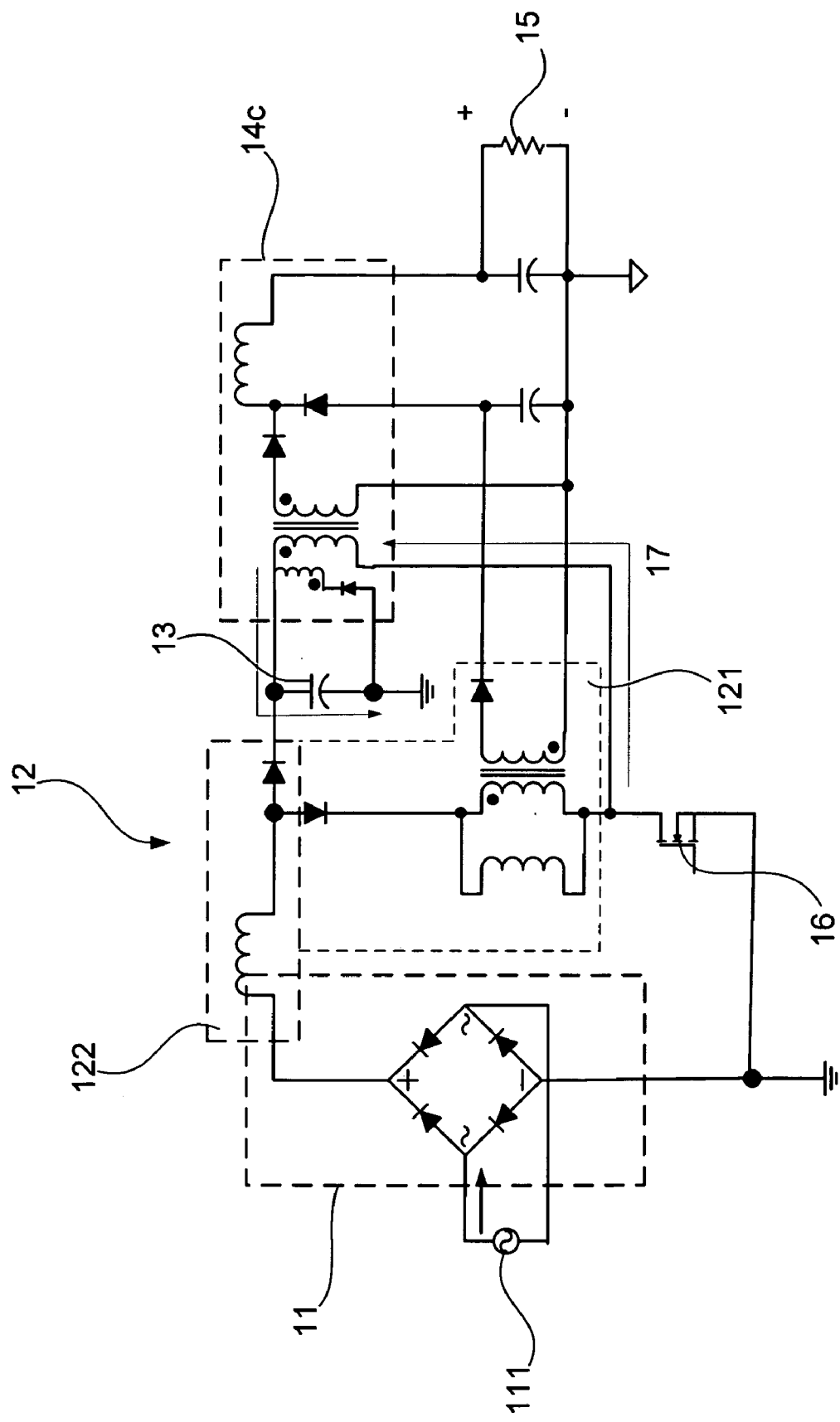
FIG. 4C is the circuit view showing the third preferred embodiment.

Please refer to FIG. 4C, which is a circuit view showing a third preferred embodiment. As shown in the figure, the third preferred embodiment reduces a size of a bulk capacitor 13, improves a dynamic response and keeps efficient. The third preferred embodiment comprises a full-wave rectifier 11 connected with a single phase AC voltage source 111; a boost-flyback semi-stage module 12 comprising a flyback sub-circuit 121 and a boost sub-circuit 122; a bulk capacitor 13; a DC/DC semi-stage 14 according to FIG. 3A is replaced with a two-input post regulator semi-stage 14c; and a first load 15, where the boost-flyback semi-stage 12 and the DC/DC semi-stage of two-in put post regulator 14c are both connected with the control switch 16.

Figure 5:
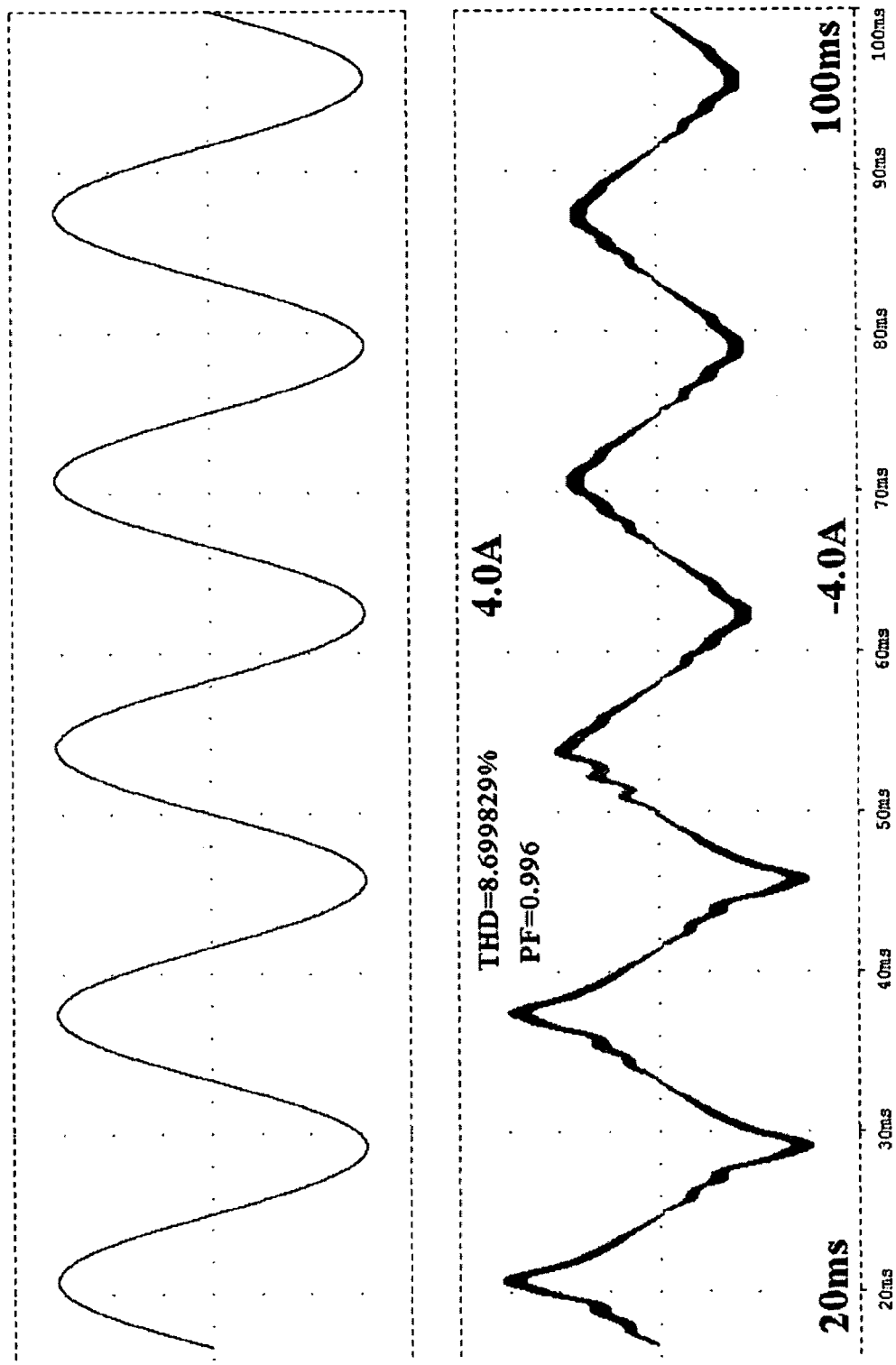
FIG. 5 is the waveforms of input voltage and current.
Figure 6:
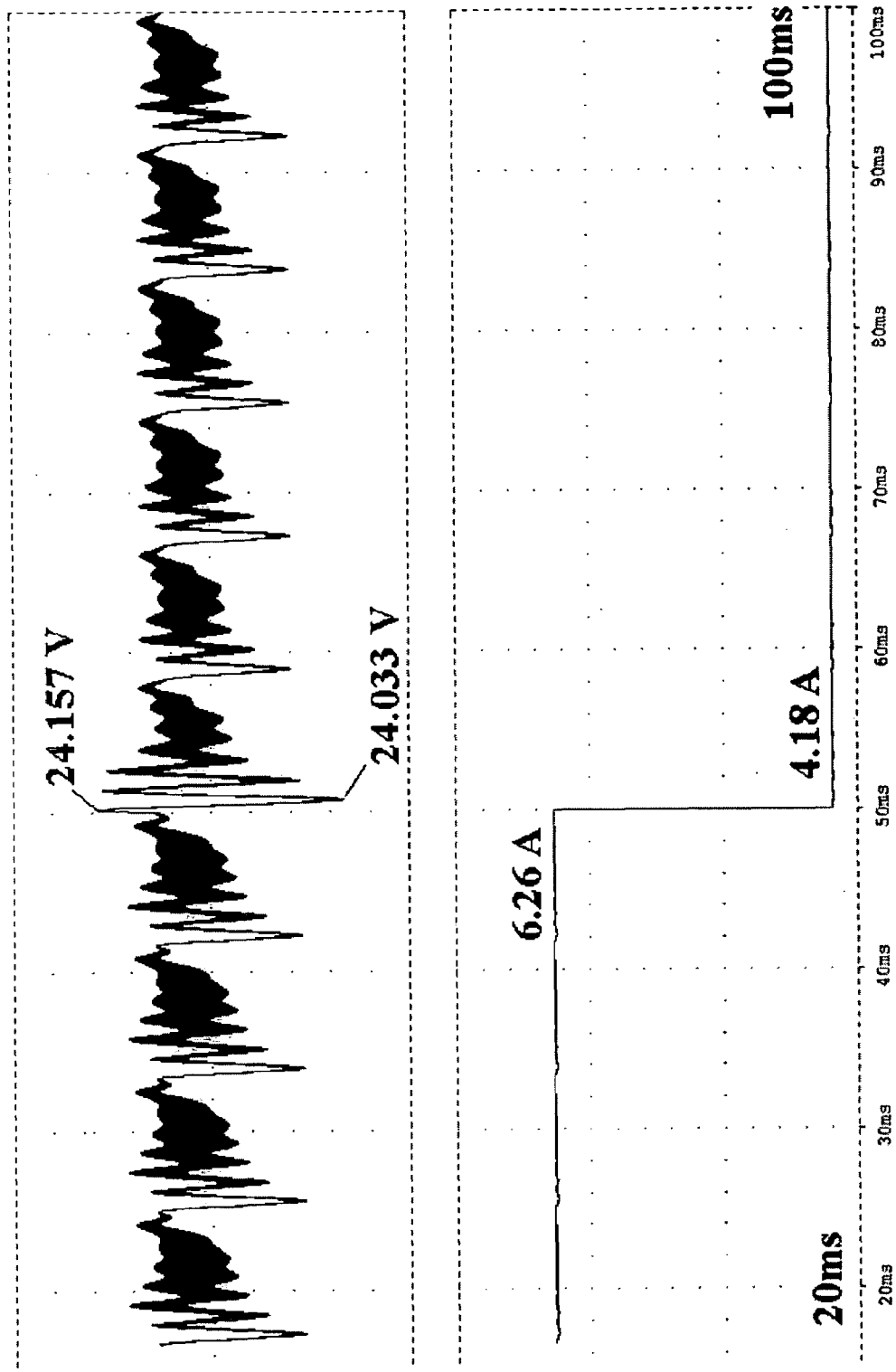
FIG. 6 is the waveforms of output voltage and current.
Figure 7:
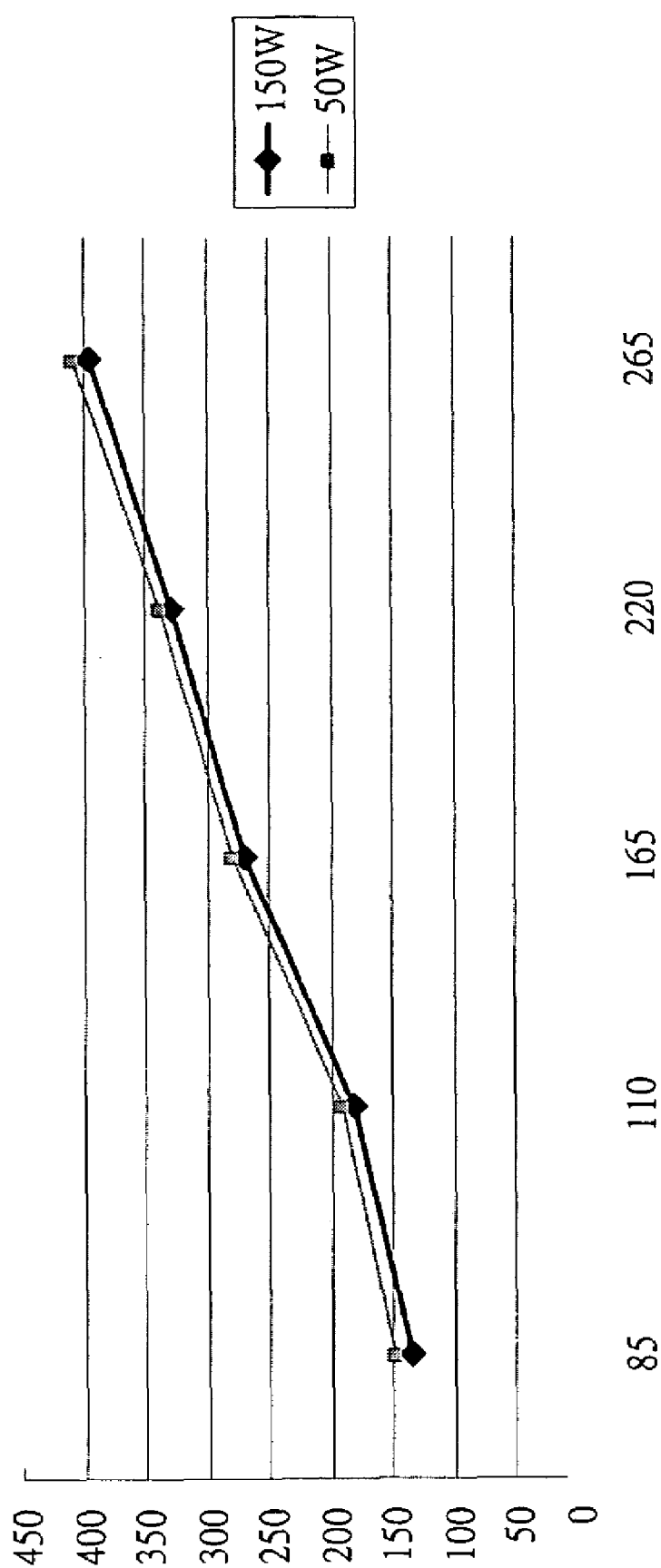
FIG. 7 is the bulk capacitor voltage curves vs. AC line voltage.
Figure 8:
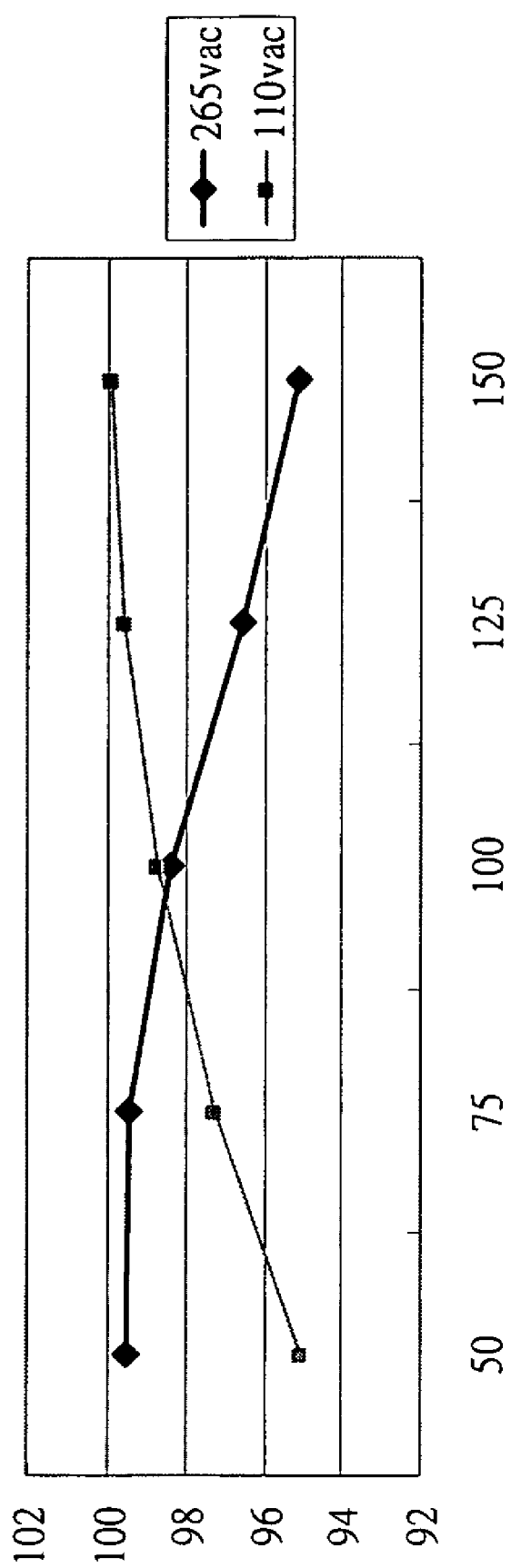
FIG. 8 is the power factor vs. output power.

The proposed circuit in FIG. 4A has been simulated in the specifications of 85-265Vac input voltage, 24Vdc output voltage, 50-150 W output power and 50 kHz switching frequency. The specifications of the critical components are: the first inductance (1222)=12 μH, the first transformer (1213) magnetizing inductance=72 μH and its turn ratio=4, the second transformer (141a) magnetizing inductance=10 mH and its turn ratio=1.6, the second inductance (144a)=500 μH. FIG. 5 shows the line voltage and current, and FIG. 6 shows the output voltage and current, both under periodic change of load (150 W to 100 W/6.26 A to 4.18 A) for single phase voltage source (111)=110V. FIG. 7 shows the bulk capacitor voltage in different input voltage. The maximum bulk capacitor voltage is 408Vdc at light load and in high line. FIG. 8 shows the power factor in different output power. The power factor is at least 94% in either high or low line.

To sum up, the present invention is a high power-factor AC/DC converter, where a boost-flyback semi-stage in the present invention has two parallel power processing paths and only one control switch so that, with a single loop output feedback control, power factor is improved and DC output power is controlled simultaneously.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. A high power-factor AC/DC converter, comprising:
   a. full-wave rectifier, said full-wave rectifier having an input, said input connected to a single phase AC voltage source;
   b. boost-flyback semi-stage, said boost-flyback semi-stage comprising an input, a boost output and a flyback output;
   c. bulk capacitor, said bulk capacitor connected to said boost output of said boost-flyback semi-stage;
   d. DC/DC semi-stage, said DC/DC semi-stage being selected from a group consisting of a forward module and a flyback module, said DC/DC semi-stage module having an input connected to said bulk capacitor;
   e. first load, said first load connected to said flyback output of said boost-flyback semi-stage and said output of said DC/DC semi-stage; and
   f. control switch, said control switch connected to said boost-flyback semi-stage and said DC/DC semi-stage.

2. The AC/DC converter according to claim 1,
wherein said boost-flyback semi stage is obtained by serially connected a boost sub-circuit and a flyback sub-circuit.

3. The AC/DC converter according to claim 2,
wherein said flyback sub-circuit comprises a first diode, a first transformer, a second diode, and a first capacitor.

4. The AC/DC converter according to claim 2,
wherein said boost sub-circuit comprises a first inductance, a third diode, and a second capacitor.

5. The AC/DC converter according to claim 2,
wherein the charging paths of said boost sub-circuit and said flyback sub-circuit are serially connected together.

6. The AC/DC converter according to claim 1,
wherein said DC/DC semi-stage module is a flyback semi-stage module.

7. The AC/DC converter according to claim 1,
wherein said control switch is a power transistor.

8. The AC/DC converter according to claim 1,
wherein said control switch is a metal-oxide semiconductor field-effect transistor (MOSFET).

9. The AC/DC converter according to claim 1,
wherein said DC/DC semi-stage module is a forward module, comprising a second transformer, a fourth diode, a fifth diode and a second inductance.

* * * * *